United States Patent Office 3,547,894
Patented Dec. 15, 1970

3,547,894
FLUORINATED POLYURETHANES
Kenneth C. Smeltz, Graylyn Crest, Wilmington, Del., assignor to E. I. du Pont de Nemours and Company, Wilmington, Del., a corporation of Delaware
No Drawing. Original application July 26, 1967, Ser. No. 656,076, now Patent No. 3,478,116, dated Nov. 11, 1969. Divided and this application Feb. 28, 1969, Ser. No. 803,399
Int. Cl. C08g 22/08
U.S. Cl. 260—77.5         5 Claims

ABSTRACT OF THE DISCLOSURE

Polyurethanes prepared by the condensation of perfluoroalkyl-terminated alkyl-1,4-propanediols of the formula $(R_f-R')_aCH_{2-a}(CH_2OH)_2$ and complementary diisocyanates, and optionally other diols. The polymers are in general useful as fabric coatings to impart oil and water repellency thereto.

CROSS-REFERENCES TO RELATED APPLICATIONS

This application is a division of application Ser. No. 656,076, filed July 26, 1967, now U.S. Pat. No. 3,478,116.

BACKGROUND OF THE INVENTION

Field of the invention

This invention relates to polyurethanes derived from perfluoroalkyl-terminated alkyl derivatives of selected propanediols.

Description of the prior art

Interest in the heat-resistant properties and the solvating powers of fluorinated organic compounds has led to increased activity in the preparation of various fluorine-containing organic materials. The preparation of such materials is, however, frequently difficult and expensive. For example, β-perfluoroalkyl glutaric acids have been prepared through a five-step procedure, while additional steps are necessary to prepare the corresponding 3-perfluoroalkyl-pentane-1,5-diol, and polymers thereof. Such preparations are described in U.S. Pat. 3,016,361. However, it was not possible to produce, by the procedure described therein, perfluoroalkyl malonic acids and their derivatives nor polymers derived from them.

SUMMARY OF THE INVENTION

This invention is directed to condensation polymers prepared from diisocyanates and (2)         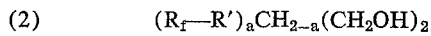

wherein $R_f$ is perfluoroalkyl of 4–20 carbons, R′ is alkylene of 2–12 carbons, and $a$ is the whole number 1 or 2. Thus the polymers of this invention are polyurethanes comprising the condensation product of at least one compound of Formula 2 and at least one organic diisocyanate. Preferably the diisocyanate has the formula B(NCO)₂ wherein B is a saturated aliphatic group of 2–16 carbons, or an aromatic group of 6–16 carbons. These polyurethanes can optionally contain units derived from diols of the formula D(OH)₂ defined above, wherein the molar ratio of the diol of Formula 2 to the diol D(OH)₂ is at least 1 to 1.

The polymers described above are useful in rendering fabrics and metals oil- and water-repellent; and as films or fibers.

DESCRIPTION OF THE INVENTION (A) Malonic acid and ester derivatives employed to prepare the propanediol monomers used in the preparation of the polymers of this invention These derivatives have the structural formula (1)         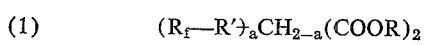

wherein $R_f$ is perfluoroalkyl of 4–20 carbons, R′ is alkylene of 2–12 carbons, R is hydrogen or lower alkyl, and $a$ is the whole number 1 or 2.

As is seen from Formula 1, these derivatives are monosubstituted ($a=1$) or disubstituted ($a=2$) derivatives of malonic acid and its esters. The perfluoroalkyl group $R_f$ can be either straight chain or branched chain, and is defined herein as including cyclic perfluoroalkyl although these latter groups are less desirable because of their general unavailability. Preferably, $R_f$ contains 6–12 carbon atoms and is straight chained. Representative perfluoroalkyl groups include the perfluorinated groups derived from butyl, amyl, hexyl, heptyl, octyl, decyl, dodecyl, tetradecyl, hexadecyl, octadecyl, eicosyl, isoamyl, isoheptyl, cyclobutyl, cyclohexyl, methylcyclohexyl and the like. Of these, the groups hexyl to dodecyl are preferred.

The group R′ is preferably the divalent straight-chain group $-(CH_2)_m-$ where $m$ is 2–12, although it can be branched. Most preferably, $m$ is a cardinal number of 2–4. Representative R′ groups include ethylene, butylene, decylene and dodecylene. The R is represented by hydrogen, methyl, ethyl, propyl, butyl, tert.-butyl, hexyl and the like. The term "lower" as used herein is defined as a chain containing 1–6 carbon atoms.

The compounds of Formula 1 are prepared by reacting the starting material $CH_2(COOR'')_2$ where R″ is lower alkyl with $R_f-R'-Z$ in the presence of a reagent capable of converting $CH_2(COOR'')_2$ to the anion $[CH(COOR'')_2]^-$. Z is a displaceable group and is preferably a carbonate, nitrate, halogen, (chlorine, bromine or iodine or arylene sulfonates, such as the toluene-sulfonate ester. The halogens and arylene sulfonates are preferred. A number of bases capable of forming the carbanion $[CH(COOR'')_2]^-$ are known. These include alkali metal alkoxides, such as sodium butoxide, potassium methoxide, and rubidium isopropoxide; alkali metal amides, sodium triphenylmethide, sodium hydride or sodium or potassium metal.

The reaction procedure is described generally by Cope, Holmes and House in chapter 4, vol. 9, of "Organic Reactions," Wiley, 1957. Reaction pressure, amounts of ingredients and time of reaction are generally not critical. The reaction is preferably carried out employing an alkali metal alkoxide as the base, in which case the alcohol precursor of the alkoxide is used in excess as the solvent. Reaction temperatures are preferably reflux temperatures, and the reaction is carried out under substantially anhydrous conditions. When only one ($R_f-R'$) group is desired in the final product, any of the above-listed bases can be employed; but when two ($R_f-R'$) groups are desired, the stronger alkoxide bases such as sodium or potassium tert.-butoxide are preferred.

The initial products obtained by the reaction are the esters wherein R of Formula 1 is lower alkyl. The corresponding acids (wherein R of Formula 1 is hydrogen) are obtained by saponification of the ester.

The reactants employed in the process are readily available and are well known in the art, except for the $R_f-R'$—arylsulfonate esters which are prepared from the well-known alcohols $R_f$—R'—OH by reaction with arylsulfonyl chlorides using the Schotten-Bauman technique in the presence of a base such as sodium hydroxide.

(B) The 1,3-propanediol monomers used to prepare the polymers of this invention

These compounds are represented by Formula 2 and are obtained by reducing a compound of Formula 1 to the corresponding diol of Formula 2. Hence, the discussion concerning the nature of $R_f$, R', R and $a$ in section (A) immediately above is applicable to the propanediols of this invention.

The reduction of carboxyl or ester groups to primary alcohol groups is well known. Ester-containing compounds (those of Formula 1 wherein R is lower alkyl) are preferred as the starting material. Reduction reagents include hydrogen and catalysts, alkali metal aluminum hydrides or borohydrides, and the like. More specifically, when the compounds of Formula 1 where R is lower alkyl (the esters) are employed, the strong reducing conditions are preferred. Thus, such reducing agents as hydrogen and copper chrome oxide, lithium aluminum hydride, hydrogen and rhodium or ruthenium, or sodium and absolute alcohol, and the like, are preferred.

The reaction conditions will vary widely depending upon the reducing reagents used. These conditions are well known in the art, as for example, "Organic Reactions," vol. 6, chapter 10, Wiley, 1951; Wagner and Zook, "Synthetic Organic Chemistry," section 84, pp. 155–157, Wiley, 1953; and Gilman, "Organic Chemistry," 2nd ed., vol. 1, pp. 827–831, Wiley, 1949.

The 1,3-propanediols described in this section (B) are useful in preparing condensation polymers by reaction with diisocyanates.

(C) The polymers of this invention

These polymers are prepared from the monomers of Formula 2 and diisocyanates of the formula $B(NCO)_2$

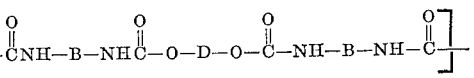

wherein B is a saturated aliphatic group of 2–16 carbons or an aromatic group of 6–16 carbons; and may also contain units derived from a diol of the formula $D(OH)_2$ wherein D is a saturated nonhalogenated aliphatic group of 2–28 carbons, and is preferably divalent alkylene of 2–12 carbons. When such a mixture of diols is used, the molar ratio of the diols of Formula 2 to the diols $D(OH)_2$ is at least 0.25 to 1 and is preferably at least 1 to 1.

The diisocyanates must be free of substituents which react with isocyanate groups. Preferably the diisocyanates are unsubstituted. Thus B is preferably divalent alkylene or divalent arylene. Representative diisocyanates useful herein include aliphatic isocyanates of structure $$OCN(CH_2)_mNCO$$

such as 1,2-ethane diisocyanate, 1,3-propane diisocyanate, 1,4-butane diisocyanate, 1,6-hexane diisocyanate, 1,8-octane diisocyanate, 1,10-decane diisocyanate, 1,12-dodecane diisocyanate, 1,16-hexadecane diisocyanate, and other aliphatic diisocyanates such as 1,3-cyclohexane diisocyanate, 1,4-cyclohexane diisocyanate. Useful examples of aromatic diisocyanates include 2,4-toluene diisocyanate, 2,6-toluene diisocyanate, 1-nitrophenyl-3,5-diisocyanate, 4,4'-diisocyantodiphenyl ether, 3,3'-dichloro-4,4'-diisocyanatodiphenyl ether, 4,4'-diisocyanatodiphenyl methane, 3,3'-dichloro-4,4'-diisocyanatodiphenyl methane, 4,4'-diphenyl diisocyanate, 4,4'-diisocyanatodibenzyl, 3,3' - dimethyl-4,4'-diisocyanatodiphenyl, 2,2'-dimethyl-4,4'-diisocyanato-diphenyl, 3,3'-dimethoxy-4,4'-diisocyantodiphenyl, 2,2'-dichloro-5,5'-dimethoxy-4,4'-diisocyanatodiphenyl, 3,3' - dichloro - 4,4' - diisocyanatodiphenyl, 1,3-diisocyanatobenzene, 1,4-diisocyanatobenzene, 1,2-naphthalene diisocyanate, 4-chloro-1,2-naphthalene diisocyanate, 4-methyl-1,2- naphthalene diisocyanate, 1,3-naphthalene diisocyanate, 1,4-naphthalene diisocyanate, 1,5-naphthalene diisocyanate, 1,6-naphthalene diisocyanate, 1,7-naphthalene diisocyanate, 1,8-naphthalene diisocyanate, 4-chloro-1,8-naphthalene diisocyanate, 2,3-naphthalene diisocyanate, 2,7-naphthalene diisocyanate, 1,8-dinitro-2,7-naphthalene diisocyanate, 1 - methyl - 2,4 - naphthalene diisocyanate, 1-methyl - 5,7 - naphthalene diisocyanate, 6-methyl-1,3-naphthalene diisocyanate, and 7-methyl-1,3-naphthalene diisocyanate.

Representaative diols $D(OH)_2$ useful herein include ethylene glycol, 1,2-propylene glycol, 1,2-butylene glycol, trimethylene glycol, tetramethylene glycol, pentamethylene glycol, hexamethylene glycol, 2-ethyl-1,3-butylene glycol, octamethylene glycol, 2-ethyl-1,3-hexanediol, decamethylene glycol, dodecamethylene glycol, tetradecamethylene glycol, hexadecamethylene glycol and octadecamethylene glycol, and diols containing ether groups such as diethylene glycol, triethylene glycol, tetraethylene glycol, octaethylene glycol, decaethylene glycol, and the corresponding polytetramethylene glycols of structure $$H{-}O(CH_2)_4{-}_nOH$$

where $n$ is from two to seven or more. The diol $D(OH)_2$ may also contain alicyclic rings, such as 1,4-cyclohexanediol, 1,4-bis(hydroxymethyl)cyclohexane, 4,4'-dihydroxy-1,1'-dicyclohexyl and the like. The lower glycols such as ethylene glycol, propylene glycol and the like are preferred.

These polymers contain the repeating unit (3) 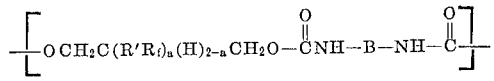

when only $[R_f{-}R'{-}]_aCH_{2-a}(CH_2OH)_2$ and $B(NCO)_2$ are used. When mixtures of the fluorinated diol and nonhalogenated diol $D(OH)_2$ are used, random arrangement probably occurs but one possible grouping is It is readily seen that approximately one mole of diisocyanate $B(NCO)_2$ is required for each mole of diol used.

These polyurethanes are prepared by mixing together approximately equimolar amounts of the diisocyanate and diols, generally with agitation. If a mixture of diols is being used, it is generally preferable to mix the diols thoroughly before combining with the diisocyanate if a random arrangement is desired. If a non-random arrangement is desired, one diol may be added to the isocyanate and, when reaction is near completion, the second diol is added. The reaction mass usually becomes somewhat viscous as reaction proceeds. Heating, say to 40° C. or higher, may be necessary to maintain the mass in a sufficiently fluid condition to allow agitation.

Alternatively, an inert solvent or diluent may be added to maintain fluidity. Such solvents would include aromatic hydrocarbons such as benzene, toluene, or xylene, chlorinated hydrocarbons such as chloroform or carbon tetrachloride or ethers such as diethyl ether, tetrahydrofuran, dioxane or the dialkyl ethers of ethylene glycol or the polyethylene glycols. Such solvents should be free of any groups which react with isocyanates, i.e. free of Zerewitinoff active hydrogen. Thus, solvents containing free hydroxy, thiol, carboxyl or like groups are not useful.

The reaction of the diols with diisocyanates should also be maintained relatively free of water, not only because isocyanates react with water to form urea linkages but also because the carbon dioxide formed can cause foaming of the product.

Unlike the polyesters hereinbefore described, the mixture of diols used to prepare the present polyurethanes should always be in the molar ratio desired in the final product. Unlike polyester formation, where conditions are such that readjustment of the relative amounts of diols can take place, the usual conditions for polyurethane formation do not allow any such readjustment. The urethan linkage, once formed, remains intact.

THE EXAMPLES

The following examples serve only to illustrate the polymers of this invention in greater detail, and are not to be considered as limiting the described invention in any manner.

The following Examples 1–6 illustrate the preparation of the malonic acids and esters used to prepare the 1,3-propanediols.

Example 1

Sodium metal (9.7 g.) was added to 311 g. dry tert-butanol in an anhydrous system. After heating under reflux for 24 hours, reaction was not complete. 48 ml. dry methanol were added, causing the remaining sodium to react within one hour. Approximately 75 ml. of liquids were distilled from the mixture. The mixture was cooled to 50° C. and 69 g. of freshly distilled diethyl malonate were added dropwise over a six minute period. Then 250 ml. of liquid were distilled from the mixture under a nitrogen atmosphere, the mixture was cooled to 65° C. and 199 g. of $F(CF_2)_6CH_2CH_2I$ were added dropwise under a nitrogen atmosphere in ten minutes. The resulting mixture was heated under reflux for 2.5 hours during which time considerable white solids precipitated. Then about 250 ml. of liquid were distilled from the mixture at which point the pot temperature reached 120° C. The residue was cooled, ether was added and the solution was extracted with a few ml. of 5% hydrochloric acid. The aqueous layer was made more strongly acidic and extracted with ether. The combined ether solutions were washed with water and dried over anh. sodium sulfate. Distillation under reduced pressure gave 15.3 g. of impure starting material $F(CF_2)_6CH_2CH_2I$, B.P. 74.5–90° C./23 mm., and 108.4 g. of mixed methyl and ethyl esters of $F(CF_2)_6CH_2CH_2CH(CO_2H)_2$ (3,3,4,4,5,5,6,6,7,7,8,8,8-tridecafluorooctylmalonic acid) $n_D^{20}$ 1.3619–1.3481, 52.5% yield.

Example 2

The mixture of methyl and ethyl esters of $$F(CF_2)_6CH_2CH_2CH(CO_2H)_2$$

(98.2 g.) obtained in Example 1 was added dropwise over a period of 11 minutes to an agitated solution of 66 g. of 85% potassium hydroxide in 70 ml. water at 63–73° C. under a nitrogen atmosphere. The mixture was then heated under reflux for one hour, then the resulting alcohols were allowed to distill from the system. Water (50 ml.) was added at 19° C., then a mixture of 150 ml. concd. hydrochloric acid and 50 g. ice dropwise, resulting in a thick, cream-colored paste. A further 100 ml. water, then a small portion of ether were added, resulting in a two phase system. The mixture was extracted three times with ether and the combined ether extracts were dried over calcium sulfate. After the solids were removed by filtration and the ether was evaporated, the resulting yellowish solid was recrystallized from anisole. Three crops of crystals of $$F(CF_2)_6CH_2CH_2CH(CO_2H)_2$$

were obtained as follows.

(I) M.P. 108–109° C., 53.7 g., white, neutral equivalent 225.
*Analysis.*—Calcd. for $C_{11}H_7F_{13}O_4$ (percent): C, 29.32; H, 1.56; F, 54.90. Mol. weight 450. Found (percent): C, 29.45; H, 1.60; F, 55.45. Mol. weight, 450.

(II) M.P. 98–100° C., 15.7 g. white, neutral equivalent 236, Mol. weight 472.

(III) M.P. 96–100° C., 2.7 g., white, neutral equivalent 238, Mol. weight 476.

Overall yield of $F(CF_2)_6CH_2CH_2CH(CO_2H)_2$, 72.1 g., 80.1%.

A yellowish residue from the above recrystallizations was distilled in a microstill, giving 2.8 g. of material, B.P. 94–98° C./0.6–0.8 mm., which solidified on cooling. Recrystallization from a mixed trichlorotrifluoroethane-petroleum ether solution at carbon ice temperature gave $F(CF_2)_6CH_2CH_2CH_2CO_2H$, M.P. 54–55° C.

*Analysis.*—Calcd. for $C_{10}H_7F_{13}O_2$ (percent): C, 29.56; H, 1.72; F, 60.84. Mol. weight, 406. Found (percent): C, 29.25; H, 1.70; F, 60.45. Mol. weight, 407.

The acid possessed strong I.R. peaks at 3.2–3.8μ and 5.83μ (Nujol mull) or 3.0–3.57μ and 5.81μ (chloroform solution), indicating —OH and carbonyl. The tridecafluorodecanoic acid resulted from decarboxylation of the malonic acid.

Example 3

Example 1 was repeated by reacting 23 g. sodium metal with 604 g. purified tert-butanol. In this case, the mixture was heated intermittently until the sodium dissolved, without adding methanol as in Example 1. Then 168 g. of distilled diethyl malonate were added dropwise (one hour) at 34–72° C. and the resulting mixture was heated at 70–75° C. for one-half hour. Then 474 g. of $F(CF_2)_6CH_2CH_2I$ were added at 70–75° C. (20 minutes) and the resulting mixture was heated under nitrogen for 20 hours at 75° C. The mixture was then distilled at atmospheric pressure until the pot temperature reached 120° C., 740 ml. of distillate collected.

The residue was cooled to 21° C. and 200 ml. water were added. The mixture was extracted with ether and the combined ether extract dried over sodium sulfate. The ether was evaporated and the residue distilled under reduced pressure, giving 58.2 g. of starting materials, B.P. 44°/10 mm. to 92°/1.05 mm., 332.6 g. of primarily the diethyl ester (containing 5–9% tert-butyl ester groups) of $F(CF_2)_6CH_2CH_2CH(CO_2H)_2$, yield 74%, B.P. 95° C./1.0 mm.–105° C./0.30 mm., $n_D^{20}$ 1.3602–1.3567, and 79.2 g. of primarily diethyl ester of $$[F(CF_2)_6CH_2CH_2]_2C(CO_2H)_2$$

B.P. 90° C./0.21 mm.–128° C./0.30 mm., $n_D^{20}$ 1.3548–1.3478, yield 15%.

EXAMPLE 4

Example 3 was repeated replacing the 474 g. of $$F(CF_2)_6CH_2CH_2I$$

with 574 g. of $F(CF_2)_8CH_2CH_2I$. After heating and isolating as in Example 3, a 75.5% yield of $$F(CF_2)_8CH_2CH_2CH(CO_2C_2H_5)_2$$

was obtained, B.P. 107–108° C./0.4 mm.
*Analysis.*—Calcd. for $C_{17}H_{15}O_4F_{17}$ (percent): D, 33.7; H, 2.5; F, 53.3. Found (percent): C, 33.5; H, 2.4; F, 53.5.

EXAMPLE 5

Example 3 was repeated replacing the 474 g. of $$F(CF_2)_6CH_2CH_2I$$

with 674 g. of $F(CF_2)_{10}CH_2CH_2I$. After heating and isolating as in Example 3, a 77% yield of $$F(CF_2)_{10}CH_2CH_2CH(CO_2C_2H_5)_2$$

was obtained, B.P. 122–123° C./0.35 mm.
*Analysis.*—Calcd. for $C_{19}H_{15}O_4F_{21}$ (percent): C, 32.3; H, 2.1; F, 56.5. Found (percent): C, 32.3; H, 2.2; F. 56.5.

EXAMPLE 6

Example 3 was repeated replacing the 474 g. of $$F(CF_2)_6CH_2CH_2I$$

with 644 g. of $F(CF_2)_6(CH_2)_{11}$—$O_3S$—$C_7H_7$ (tolylate ester of $F(CF_2)_6(CH_2)_{11}OH$). After heating and isolating as before, a 95% yield of $$F(CF_2)_6(CH_2)_{11}CH(CO_2C_2H_5)_2$$

was obtained; B.P. 136–138° C./0.05 mm.

*Analysis.*—Calcd. for $C_{24}H_{33}O_4F_{13}$ (percent): C, 45.6; H, 5.2; F, 39.1. Found (percent): C, 46.0; H, 5.4; F, 39.4.

Employing the procedures described in Examples 1–6, any of the malonic esters and acids described in section (A) herein can be prepared by replacing the reactants and bases with others listed therein.

The following Examples 7–11 illustrate the preparation of the 1,3-propanediols used to prepare the polyurethanes of this invention.

EXAMPLE 7

A solution of 51 g. of $F(CF_2)_6CH_2CH_2CH(CO_2C_2H_5)_2$ in 200 ml. dry purified diethyl ether was added dropwise to a stirred slurry of 7.6 g. lithium aluminum hydride in 500 ml. dry purified ether under nitrogen. The addition took one hour, while maintaining the mass under gentle reflux. After addition was complete, the mass was heated under reflux for two hours. Ethyl acetate (30 ml.) was added dropwise to the cooled mixture followed by 400 g. of 10% aqueous sulfuric acid. After stirring for a short time, the resulting mixture was separated and the aqueous layer extracted with ether. The combined ether layers were dried over anh. sodium sulfate. Evaporation of the ether gave 33.1 g. of crude white crystals, M.P. 55–65° C. and 6.1 g. of liquid. Distillation of the liquid under reduced pressure indicated it to be a mixture of starting ester and a substance which appeared to be

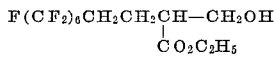

due to incomplete reduction.

The solids were recrystallized from an 80/20 (-by volume) mixture of benzene/acetonitrile, giving 29.4 g. of $F(CH_2)_6CH_2CH_2CH(CH_2OH)_2$ [2-(3',3',4',4',5',5',6',6', 7',7',8',8'-tridecafluoroctyl)-1,3-propanediol], M.P. 72.5–73.5° C. The product may also be recrystallized from chloroform.

*Analysis.*—Calcd. for $C_{11}H_{11}F_{13}O_2$ (percent): C, 31.29; H, 2.61; F, 58.52; O, 7.58. Found (percent): C, 31.2; H, 2.6; F, 58.5.

The nuclear magnetic resonance spectra in the H1 and F19 regions agreed with the assigned structure.

EXAMPLE 8

A solution of 85.2 g. of $$[F(CF_2)_6CH_2CH_2]_2C(CO_2C_2H_5)_2$$

in 200 ml. dry and purified diethyl ether was added dropwise to a stirred slurry of 9.5 g. lithium aluminum hydride in 500 ml. dry ether under nitrogen. The addition took 82 minutes, keeping the mass at gentle reflux. After addition, the mass was heated under reflux for 4 hours.

After cooling to 18° C., 500 g. of 10% sulfuric acid were added dropwise to the stirred slurry. The resulting mixture was separated and the aqueous layer extracted with ether. The combined ether solutions were dried over sodium sulfate. Evaporation of the ether and recrystallization of the resulting crude product from chloroform gave the following:

*Crop 1.*—66.2 g., M.P. 77–77.5°C., white crystals, strong infrared peak at 3.01μ.

*Crop 2*—2.7 g., M.P. 62–65° C., off-white crystals, medium strong infrared peak 3.01μ, trace peak at 5.85μ due to ester carbonyl.

*Residue.*—Viscous amber liquid, infrared spectrum containing both hydroxyl and carbonyl peaks.

*Analysis* (Crop 1.—Calcd. for $C_{19}H_{14}F_{26}O_2$ (percent): C, 29.7; H, 1.8; F, 64.3; O, 4.2. Found (percent): C, 29.5; H, 1.8; F, 64.2.

Thus, Crop 1 was $[F(CF_2)_6CH_2CH_2]_2C(CH_2OH)_2$ [2,2 - bis(3',3',4',4',5',5',6',6',7',7',8',8',8' - tridecafluorooctyl)-1,3-propanediol], yield (Crop 1 only) 86.2%.

EXAMPLE 9

Using the procedure of Example 7, $$n\text{-}C_8F_{17}CH_2CH_2CH(CO_2C_2H_5)_2$$

was caused to react with lithium aluminum hydride in a molar ratio of one mole ester to two moles hydride, giving $n\text{-}C_8F_{17}CH_2CH_2CH(CH_2OH)_2$ in 78% yield, M.P. 111–114° C. Infrared analysis indicated freedom from ester groups.

*Analysis.*—Calcd. for $C_{13}H_{11}O_2F_{17}$ (percent): C, 29.9; H, 2.1; F, 61.9. Found (percent): C, 29.9; H, 2.1; F, 59.3.

EXAMPLE 10

In the same manner as Example 7, $$n\text{-}C_{10}F_{21}CH_2CH_2CH(CO_2C_2H_5)_2$$

was caused to react with lithium aluminum hydride in a ½ mole ratio, giving $n\text{-}C_{10}F_{21}CH_2CH_2CH(CH_2OH)_2$ in 90% yield, M.P. 141–143° C.

*Analysis.*—Calcd. for $C_{15}H_{11}O_2F_{21}$ (percent): C, 28.9; H, 1.8; F, 64.1. Found (percent): C, 29.2; H, 1.8; F, 68.8.

EXAMPLE 11

In the same manner as Example 7, $$n\text{-}C_6F_{13}(CH_2)_{11}CH(CO_2C_2H_5)_2$$

was caused to react with lithium aluminum hydride in a ½ mole ratio, giving $n\text{-}C_6F_{13}(CH_2)_{11}CH(CH_2OH)_2$ in 81% yield, M.P. 90–91° C. after recrystallization from chloroform.

*Analysis.*—Calcd. for $C_{20}H_{29}O_2F_{13}$ (percent): C, 43.8; H, 5.3; F, 45.1. Found (percent): C, 44.3; H, 5.4; F, 43.6.

Using the above procedures of Examples 7–11, any malonic ester $[R_f\text{—}R'\text{—}]_aCH_{2-a}(CO_2R)_2$ described in section (A) herein may be reduced to the corresponding 1,3-propanediol $[R_f\text{—}R'\text{—}]_aCH_{2-a}(CH_2OH)_2$ The following example illustrates the preparation of the polymers of this invention:

Example 12

To 17.0 parts of $n\text{-}C_6F_{13}CH_2CH_2CH(CH_2OH)_2$ at 110° C. were added over a period of 20 minutes 5.28 parts of toluene diisocyanate consisting of 80% 2,4-isomer and 20% 2,6-isomer. Towards the end of the addition, the reaction mass became viscous so the temperature was increased to 140° C. then held at 140–160° C. for 75 minutes. No further viscosity increase was observed after 3 hours at 195° C. Filaments could be drawn from the melt.

Contact angles were determined as described by Johnson and Dettre ["Advances in Chemistry," series No. 43, 112–135 (1964), J. Phys. Chem., 68, 1744 (1964), ibid., 69, 1507 (1965)] which shows that the usefulness of textile treating agents as oil and water repellent agents may be evaluated by measurements of contact angles of water and hexadecane on flat films of the polymers provided both advancing and receding contact angles are measured. In the capillary type system which exists in treated textiles, it is the advancing angles which controls spreading and wicking [Furmidge, J. Colloid. Sci., 17, 309 (1962), Berch et al., Textile Research Journal, 35, 252–260 (1965)]. Thus both oil and water repellency ratings are directly related to the advancing angles. The receding angles help predict whether or not droplets will release or be fully blotted off. The difference between the two angles is called contact angle hysteresis which is ideally as small as possible. The contact angles were as follows: water, advancing 115°, receding 65°; hexadecane, advancing 70°, receding 63°.

Example 13

(A) Preparation of bischloroformate: A solution of 21.1 parts $n\text{-}C_6F_{13}CH_2CH_2CH(CH_2OH)_2$ in 11.9 parts acetone was added over a period of 75 minutes to six molar equivalents of liquid phosgene at −15° C. in a vessel cooled with a carbon-ice condenser and provided with an efficient off-gas scrubber. The resulting mixture was held at —15° C. for one hour, then was allowed to warm to room temperature while purging with nitrogen to remove excess phosgene. After purging overnight, 24.5 parts (89.4%) of clear colorless liquid with an infrared spectrum consistent with the structure

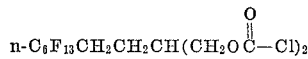

was obtained.

*Analysis.*—Calcd. for $C_{13}H_9O_4Cl_2F_{13}$ (percent): C, 28.5; H, 1.6; F, 45.1. Found (percent): C, 29.9, 30.3; H, 1.8, 1.9; F, 45.2, 45.3.

(B) Preparation of polyurethane: To 2.15 parts anhydrous piperazine heated to 110° C. was added under nitrogen during 20 min. 13.7 parts of

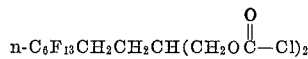

A further 0.5 part piperazine was added and heating was continued for 25 minutes. After cooling, the crude polymer was dissolved in chloroform, washed with water and then was precipitated by pouring into methanol. The polymer was shown to have the structure

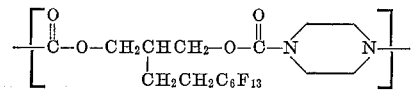

and had an inherent viscosity of 0.07 as a 0.5% solution in chloroform at 30° C.

*Analysis.*—Cacld. for $C_{17}H_{17}O_4N_2F_{13}$ (percent): C, 36.4; H, 3.0; F, 44.1. Found (percent): C, 35.2, H, 3.7; F, 44.8.

When applied to 80 x 80 cotton fabric at 5% OWF from chloroform, dried and cured for 3 min. at 180° C., the resulting cloth had a 50 water repellency rating and a 3 oil repellency rating when tested by the test methods described below. Contact angles with water and hexadecane, determined as described in Example 12, were as follows: water, advancing 115°, receding 66°; hexadecane, advancing 68°, receding 60°.

Water repellency was determined using test method 22–1952 of the American Association of Textile Chemists and Colourists (ASTM Method D–583–63). Oil repellency was determined using test method 118–1966T of the American Association of Textile Chemists and Colourists. Both tests are described in the Technical Manual, 1966, of the aforenamed association.

As seen in the foregoing example, the urethanes can also be prepared by condensing a bischloroformate with primary and secondary saturated aliphatic or aromatic diamines. The bischloroformates are prepared by reacting the chlorinated diol with phosgene, usually in an inert solvent. The condensation of the bischloroformate with the diamine is usually carried out by adding chloroformate at elevated temperatures. The aliphatic diamines may be diaminoalkanes such as ethylene diamine, 1,3-propylene diamine, 1,4-butylene diamine, 1,6-diaminohexane, 1,8-diaminooctane, 1,10-diaminodecane, 1,12-diaminododecane or 1,16-diaminohexadecane, diaminocycloalkanes such as 1,3-diaminocyclohexane, 1,4-diaminocyclohexane and the like or cyclic diamines such as piperazine and the like. The aromatic diamines include the phenylene diamines, the toluene diamines, the nitrophenylene diamines, diaminodiphenyl, diaminodiphenyl ether, 4,4′-diamino-3,3′-dichlorodiphenyl, 4,4′-diamino-3,3′-dichlorodiphenyl ether, 4,4′-diaminodiphenylmethane, 4,4′-diamino-3,3′-dichlorodiphenylmethane, 4,4′-diaminodibenzyl, 4,4′-diamino-3,3′-dimethyldiphenyl, and the corresponding 2,2′-dimethyl compound, 4,4′-diamino-3,3′-dimethoxydiphenyl, 4,4′-diamino-2,2′-dichloro-5,5′-dimethoxydiphenyl, the various naphthalene diamines (1,2-, 1,3-, 1,4-, 1,5-, 1,6-, 1,7-, 1,8-, 2,3-, 2,7-), the various monochloro, monomethyl and mononitro derivatives of these naphthalene diamines.

By replacing the reactants of Example 13 with any of those described in section (C) herein, any of the polyurethanes described therein can be obtained. Thus, for example any one of $$n\text{-}C_8F_{17}CH_2CH_2CH(CH_2OH)_2$$
$$n\text{-}C_{10}F_{21}CH_2CH_2CH(CH_2OH)_2$$
$$[n\text{-}C_6F_{13}CH_2CH_2]_2C(CH_2OH)_2$$

or $$n\text{-}C_6F_{13}(CH_2)_{11}CH(CH_2OH)_2$$

may be used without essential change. Also, in place of the mixed isocyanate used, any one of toluene-2,4-diisocyanate, toluene-2,6-diisocyanate, methylene bis-(4-phenylisocyanate), 4,4′-diisocyanatodiphenyl or 4,4′-diisocyanatodiphenyl ether may be used.

Examples 12 and 13 demonstrate the usefulness of the polymers of this invention. Most are oil- and/or water-repellent ingredients when applied to fabrics. In addition, some of the polymers can be drawn into fibers or filaments or can be cast from solution into self-supporting films.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A polyurethane comprising recurring units of the structural formula

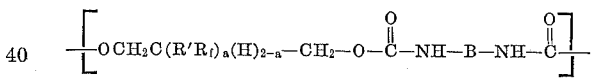

wherein $R_f$ is perfluoroalkyl of 4–20 carbon atoms; R′ is alkylene of 2–12 carbon atoms, $a$ is the whole number 1 or 2; and B is a saturated aliphatic group of 2–16 carbon atoms or an aromatic group of 6–16 carbon atoms.

2. The polyurethane of claim 1 wherein B is alkylene of 2–16 carbon atoms or arylene of 6–16 carbon atoms.

3. The polyurethane of claim 1 which contains, additionally, units of the structural formula —O—D— wherein D is a saturated aliphatic group of 2–18 carbon atoms.

4. The polyurethane of claim 3 wherein D is alkylene of 2–18 carbon atoms.

5. A polyurethane comprising recurring units of the structural formula

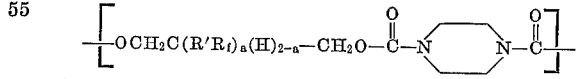

wherein $R_f$ is perfluoroalkyl of 4–20 carbon atoms, R′ is alkylene of 2–12 carbon atoms, and $a$ is the whole number 1 or 2.

References Cited
UNITED STATES PATENTS
2,911,390   11/1959   Smith.
3,413,271   11/1968   Weesher.

DONALD E. CZAJA, Primary Examiner

M. J. WELSH, Assistant Examiner

U.S. Cl. X.R.
117—139.5, 145; 260—33.8